M. CHASE.
Yarn Covering.
No. 158.
Reissued Jan. 1, 1850.
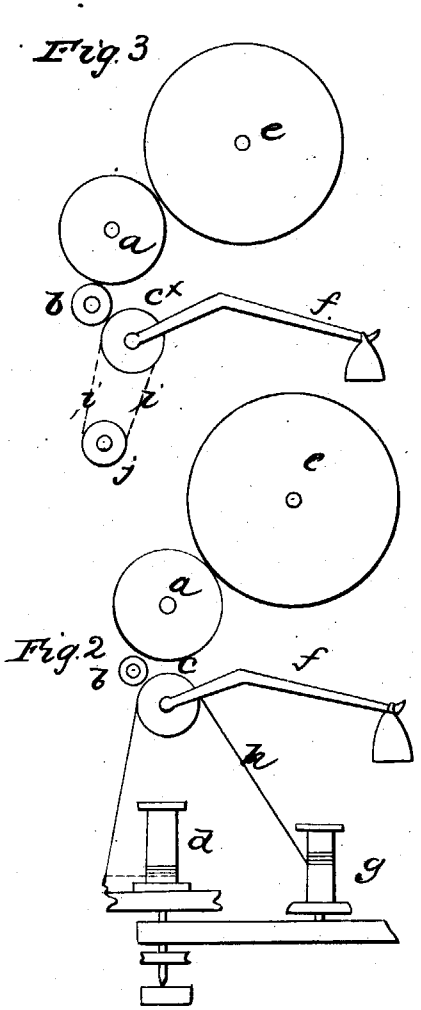
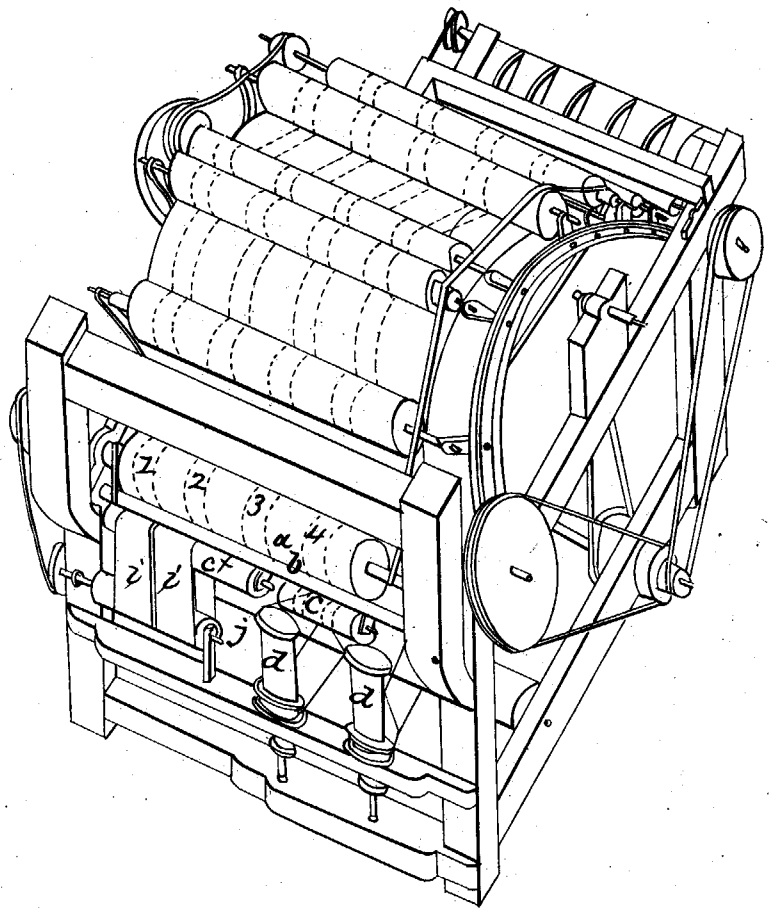
N. PETERS. Photo-Lithographer, Washington, D. C.

UNITED STATES PATENT OFFICE.

RICHARD S. STEWART, OF BALTIMORE, MARYLAND, EXECUTOR OF GEORGE LAW.

CARD-SPINNER.

Specification forming part of Letters Patent No. 2,511, dated March 23, 1842; Reissue No. 158, dated January 1, 1850.

*To all whom it may concern:*

Be it known that the following is a full and exact description of a new and useful improvement on the carding and spinning machine, denominated the "card-spinner," for manufacturing yarn from two or more different materials at the same time, by which improvement wool, silk, or other material directly from the card is twisted or wrapped round or combined with a thread of a different material, thereby producing a new and useful result—that is to say, a combined or composition thread or yarn which may be employed with great advantage for many purposes—invented by MOSES CHASE, and for which Letters Patent of the United States were granted to him on the 23d of March, in the year 1842, the said Letters Patent having been surrendered for the purpose of describing the same invention and pointing out in what it consists in more full, clear, and exact terms than was done in the original specification, and for the purpose, likewise, of having several patents issued for distinct and separate parts of the invention as originally patented.

This composition yarn may be produced by the following-described machinery: The ordinary carding-machine is taken, leaving out the comb or stripper commonly used to clear the wool from the doffer-cylinder *a*, Figure 1, and substituting in its place two rollers, *b* and *c*, which take the material from the doffer *a* and deliver it to the spinners *d d*, which are represented as common throttle-spindles.

Fig. 2 is an end view, where *c* is the main card-cylinder. *a* is the doffer-cylinder; *b* and *c*, the delivering-rollers. (Represented by the same letters in Fig. 1.) *f* is one of the two weighted levers which press the rollers *c* up against the roller *b*. Roller *c* receives its motion from the friction of roller *b*. Roller *c* turns in the ends of the levers. *g* represents a spool of cotton or other thread, previously spun but twisted very loosely, set on a pin in any convenient place. *g* is the thread of cotton, supposing cotton to be the material which is to be covered and combined with another material, passing over the roller *c* and between *b* and *c*, where it comes in contact with the wool or other covering material from the doffer-cylinder, and, being twisted while in contact by the spindle *d*, takes up the wool, which it combines with itself, as the fibers of the cotton in the process of being twisted tight catch and hold the fibers of the wool or other covering material between them. If the spool of thread previously spun be left out, then the wool, silk, cotton, or other material coming through the machine may be taken from the doffer-cylinder *a* by the rollers *b* and *c* and spun directly into yarn by the spindle *d*.

In Fig. 1, *c*, *x*, and *b* first take the wool, silk, or other material from the cards of the doffer *a*, which is the first breaker, and by a belt or belts and apron *i i*, to which the material adheres so as to be carried round on said belt and wound up till a sufficient quantity is collected to make a feed when taken off said apron for the second breaker, or No. 2, and which material is wound on the belt, as before described, until a sufficient quantity is collected for a feed for one or both of the cards 3 and 4 and the spinners *d d*.

Fig. 3 is an end view of the main cylinder; *a*, the doffer-cylinder. *b* and *c x* are the delivering-rollers; *i i*, the belt, and *j* the roller shown by the same letter in Fig. 1. *f* is one of the weighted levers supporting the roller *c x* and bracing it against the roller *b*, and these rollers take the material from the doffer-cylinder *a*.

The carding-machine represented in Fig. 1 has four divisions of fillet-cards, as 1, 2, 3, and 4. 1 and 2 are two divisions for breaking the material. 3 and 4 are for preparing for spinning. The spool *g* is not shown in this figure. By breaking the wool or other material on another machine, or by a different arrangement, all the divisions of fillet-cards may be used in preparing the wool for spinning, when four yarns of thread instead of two would be spun at the same time by placing spindles where the belts *i i* are represented in the drawings.

In the drawing Fig. 1 the breaking and spinning is done on one machine in the manner represented.

What I claim as new, and desire to secure by Letters Patent, is—

The combination by which the said composition thread or yarn is produced, as above described, consisting of the delivering-rollers *b* and *c*, between which the covering material and the thread to be covered come in contact, as described, combined with the said doffer-cylinder *a*, the spindle *d*, for twisting the thread while it is in contact with the covering material, and the spool *g*, supplying the thread to be covered, all as described and represented in this specification and the accompanying drawings, or their mechanical equivalents in like combination, and for the purpose set forth.

R. S. STUART,
*Executor of George Law.*

Witnesses:
JNO. W. B. LATROBE,
HENRY LATROBE.